March 13, 1962
H. R. DALTON
3,025,180
PRESSURE SENSITIVE COATING COMPOSITIONS, THEIR
PREPARATION AND RECORDING BLANKS
COATED THEREWITH
Filed Sept. 11, 1959
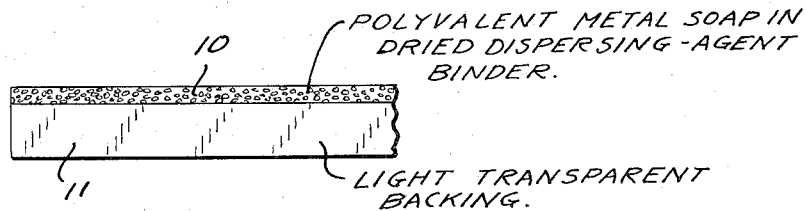
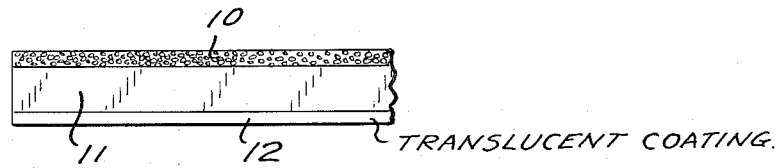
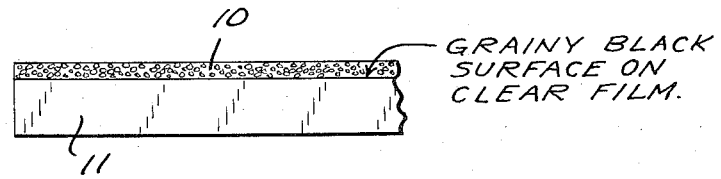
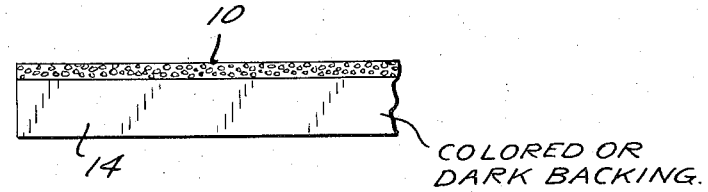
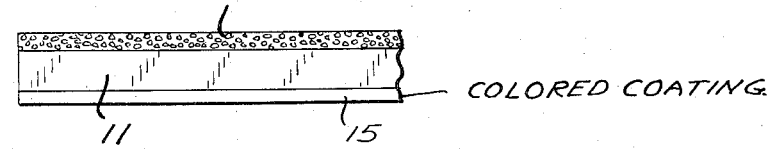
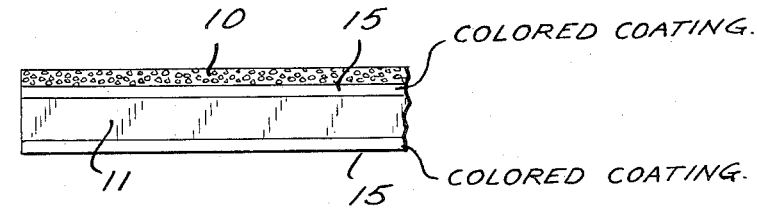
INVENTOR
HAROLD R. DALTON
BY A.A. Orlinger
ATTORNEY 3,025,180
PRESSURE SENSITIVE COATING COMPOSITIONS, THEIR PREPARATION AND RECORDING BLANKS COATED THEREWITH
Harold R. Dalton, 931 Rydal Road, Jenkintown, Pa.
Filed Sept. 11, 1959, Ser. No. 839,389
15 Claims. (Cl. 117—36.7)

This invention relates to a new coating composition for application as a substantially continuous non-transparent, i.e. relatively opaque, coating over a surface, the opacity of which coating is from at least partially to practically completely reduced, for example, wherever the coating is subjected to impact pressure such as by applying a writing stylus or typewriter key, whereby such thus applied impression easily is legible.

The invention relates also to the method of preparing this new coating composition with its unique properties described hereinbelow, and also to the method of preparing with such a coating composition an impact or pressure sensitive, as well as heat sensitive, recording blank. This invention then also relates to the thus obtained recording blanks.

More particularly, the invention is that of such a coating mixture or composition wherein pigmenting material consisting of (a) non-transparent discrete particles of a polyvalent metal soap of a fatty acid having at least six carbon atoms and which soap is solid at the ambient temperature of preparation and of use of the coating composition and of the resulting coating therefrom and (b) inert pigment from zero to about seventy-five percent of the weight of the pigmenting material, is suspended in a volatilizable liquid suspending vehicle which is inert to said pigmenting material (i.e. the soap and any added pigment) and comprises in from at least suspension to solution therein (i) at least one polyamide resin having an amine number of from about ninety to about three hundred and fifty and effective as a dispersing agent for said pigmenting material in said vehicle, and (ii) at least one epoxy resin; which resins react together, and are in a ratio to one another, to form a chain and cross-linked reaction product and to serve as a dispersing-agent-binder for said pigmenting material in said vehicle; said vehicle being otherwise inert to said resins and the surface on which the composition is to be applied and being volatilizable from the composition at a temperature below that at which change in physical character of said coating begins; said suspension containing said pigmenting material in an amount exceeding that of the total resin content.

The invention also more particularly is that of the preparation of this new coating composition by dispersing the aforesaid polyamide and epoxy resin constituents and the specific polyvalent metal soap constituent (and also any added inert pigment) merely by agitation alone in such aforesaid suspending vehicle.

In addition to embracing such a coating composition and the method of preparing it, the invention also is that of the method of preparing an impact or pressure sensitive, as well as heat sensitive, recording blank by applying to a surface of a backing member or other supporting member a coating of this new coating composition of the invention, and volatilizing the liquid suspending vehicle from the applied coating, and thereafter letting the resins complete their reaction to form the chain and cross-linked reaction product thereof.

Also part of the invention is the resulting recording blank, as well as the resulting dry coating comprising the polyvalent metal soap (and any added pigment) substantially homogeneously dispersed throughout this dispersing-agent-binder reaction product.

A unique feature of the invention is the use of this chain and cross-linked reaction product of the polyamide resin and the epoxy resin as a binder for the polyvalent metal soap and any added pigment, in that such particular binder by itself and before completion of the reaction to form a hard and tough product is a good dispersing agent and thus serves as such for the pigmenting material. For that reason the expression "dispersing-agent-binder" is used herein to show that this new type of binder has that property by which it serves also as a good dispersing agent for the particles of the pigmenting material in the coating composition.

The expression "chain and cross-linked reaction product" of the polyamide resin and the epoxy resin is used herein to designate that these two types of resins react with one another directly, without the intervention of some other reactant and even without the application of any operating step other than merely mixing them in a liquid vehicle, with the apparent formation of a chain and cross-linked reaction product, as illustrated in the structural formulas which follow.

A particular feature of the recording blank of the invention is that its coating does not dust or flake off during use of the blank and does not require a protective covering film.

A significant feature of the polyvalent metal soap containing coating of the recording blank of the invention is that its hardness and response to impact or pressure can be controlled more readily and selectively than was heretofore possible.

A further unexpected feature of the invention is that the herein new coating compositions can be prepared readily by subjecting the starting materials (i.e. including polyvalent metal soap, any added pigment, and the polyamide and epoxy resins) to high speed mixing with the ordinarily available high speed mixers in the suspending vehicle and without necessarily having to subject them to any of the intensive mechanical treatments or workings, such as colloid milling or ball milling, as is required when working with the heretofore used binding agents.

Still another unexpected advantage in the coating compositions of the invention is that the use of the polyamide resin with the epoxy resin to form the dispersing-agent-binder, in preparation of these compositions permits reducing the amount of polyvalent metal soap by from about twenty-five to fifty percent of that required in the earlier mixtures, for example, those of my Patent 2,313,808, and yet without adversely affecting the covering power or opacity of the coating produced and also without making it prone to cracking, flaking or dusting.

Heretofore, the hardness of a coating containing particles of a polyvalent metal soap dispersed in the earlier used binders could be controlled to some limited extent by the proportion of binder in the coating. Nevertheless, such coatings had undesirable limitations. For example, increased proportions of binder not only made the coating undesirably harder and thus more rigid and less ductile, but also make it much less adhesive to the backing member and readily prone to cracking, dusting and flaking.

Such earlier coatings thus were restricted in scope of their utility by being inapplicable for many purposes and in certain uses. To illustrate, a recording blank with such earlier type of coating is useless in an operation employing a vibrating stylus, such as occurs in facsimile signal reproduction.

The foregoing and other limitations, restrictions and shortcomings of the earlier used opaque coating compositions and of the recording blanks obtained by using them are overcome by the coating compositions, methods, recording blanks, and coatings of this invention.

Considered broadly, the method of preparing these advantageous coating compositions of this invention and the resulting coating compositions, comprises mixing from about ten to about eighty-five parts of an epoxy resin with from about ninety to about fifteen parts of a polyamide resin (having an amine number of from about ninety to about three hundred and fifty) in an organic and/or aqueous liquid volatilizable suspending vehicle that is inert to both of said resins and to the later to be added polyvalent metal soap, and any inert pigment if desired, and which vehicle dissolves or colloidally disperses the resin constituents, and in a sufficient quantity to permit their admixture therein along with said pigmenting material and by high speed agitation; adding the finely divided polyvalent metal soap of a fatty acid (which soap does not melt at the ambient temperature at which the coating and recording blank to be made with it is to be kept and used) and any inert pigment if desired, and in an amount from about three to about twenty-five times the total of both of those types of resins used; and agitating the mixture, for example, with a high speed mixer, until homogeneous.

Generally, from about ten to about fifteen minutes is sufficient time for the agitation homogeneously to disperse the polyvalent metal soap, alone or with pigment, in the suspending vehicle.

The polyvalent metal soap of a fatty acid should be one that does not melt, and will remain solid in discrete and as non-transparent particles, at the ambient temperatures prevailing in the environs wherein the coating composition and the recording blanks made by applying it to the selected backing member surface are to be used. Thus, there generally can be used any polyvalent metal soap of any polyvalent metal with any fatty acid having at least six carbon atoms, and beneficially, say, from six to about twenty-four carbon atoms, so long as the soap does not melt at the highest ambient temperature in the locality where the coating or resulting coated product is to be used. The non-transparent particles of a satisfactory soap generally show under those conditions submicroscopic pores within the soap particles in the finished coating.

So far as presently indicated such polyvalent metal soap advantageously can be that of such fatty acid having up to and including eighteen carbon atoms, such as palmitic, stearic, hydroxystearic, lauric, oleic, sebacic, capric, caprylic acids, and the like. Such soaps from fatty acids having twelve through eighteen carbon atoms, such as the fatty acids of cocoanut oil, are particularly generally effective.

In some conditions some metal soaps of some soap-making organic acids gel, or partially or wholly dissolve in some organic solvents. This necessitates bearing that in mind in selecting the constituents of the liquid suspending vehicle to use in such conditions, so as to prepare a satisfactory dispersion with suitable coating or rheological properties, i.e. having non-transparent solid particles of the polyvalent metal soap dispersed in said vehicle.

The pigmenting material (i.e. polyvalent metal soap and any added pigment) is not limited to any specific ratio to the resins which constitute the dispersing-agent-binder. Advantageously it exceeds this binder (i.e. sum of the polyamide and epoxy resins used) and varies from about two to about twenty-five times the total weight of said resins of the dispersing-agent-binder.

Ordinarily, any polyamide resin can be used for reaction with the epoxy resin in the preparation of their reaction product, so long as the polyamide is not so volatile as to be lost before its reaction with the epoxy resin is completed after the coating composition has been applied to a backing member, and cannot be disassociated from the epoxy resin portion of the resin when the coating is being dried by volatilization of the liquid suspending vehicle, for example, at about 200° F.

Beneficially, the polyamide resin should have an amine number of from about eighty-eight to about three hundred and fifty, and can be of the type shown in U.S. Patent No. 2,705,223, and advantageously be one having an excess of amine groups and an amine number of from about two hundred to about three hundred and such as shown in U.S. Patent No. 2,881,194.

Any of the various epoxy resins can be used, for example, such epoxy resins, the nature of which is illustrated generally in the U.S. Patent No. 2,811,495 (column 2, lines 20–48) and in U.S. Patent 2,891,927 (column 2, lines 23–60); so long as the epoxy resin is not so volatile as to be lost before its reaction with the polyamide resin is completed after the coating composition has been applied to a backing member, and cannot be disassociated from the polyamide portion of the resin when the coating is being dried by volatilization of the liquid suspending vehicle, for example, at about 200° F.

The reaction between any selected polyamide resin and epoxy resin involves an amine group of the polyamide and the epoxy group of the other resin, and can be illustrated as follows:

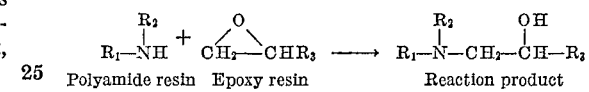

Polyamide resin   Epoxy resin           Reaction product and

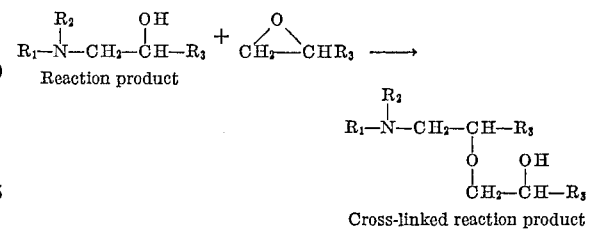

Reaction product

Cross-linked reaction product

Thus, when a liquid polyamide resin is mixed with a liquid epoxy resin, chemical reaction as just illustrated occurs between the amino groups of the polyamide and the epoxy groups of the epoxy resin to give an intermediate chain reaction product, the hydroxyl groups of which then react with epoxy groups of the epoxy resin to form the chain and cross-linked reaction product (herein already also called the dispersing-agent-binder). Such chemical reaction also occurs between both of these resins, even if any of them is solid, in the hereinabove described liquid suspending vehicle.

All of the various epoxy resins tested react readily with the polyamide resins at room temperature, although heat accelerates the reaction. The reaction need not be confined merely to use of a single polyamide resin and a single epoxy. One or more of either or both types of these resins can be used. The reaction between them is one wherein the reactivity is a function of the amine number or value (defined in U.S. Patent No. 2,881,194, column 2, lines 2–5). In the specific Examples 1 through 4 below, the reaction between these resins is relatively slow. This is an advantage in that the dispersion resulting from mixing and agitating them together with the pigmenting material remains satisfactorily fluid for as long as about four to about five hours and possibly longer, thereby providing adequate opportunity for a smooth coating to be applied. Inclusion of a low boiling low molecular weight organic acid stabilizes the coating composition for a longer period of time.

Although not restricted to them, use of liquid epoxy resins ordinarily is preferred because they yield coating compositions with lower viscosity with concomitant greater spreading facility. Ordinarily no plasticizer is needed, for the character of the binder in the dry coating can be varied, e.g. from soft to hard, by decreasing the ratio of polyamide resin to epoxy resin in the initial quantities of these two resins taken for preparation of the detergent-agent-binder. However, modifying resins or plasticizers may be used if needed or required for any desired particular characteristic in the final coating.

The liquid suspending vehicle for the pigmenting material and the polyamide and epoxy resins, as noted above, must be inert to the non-transparent polyvalent metal soap and any added pigment, should dissolve or at least colloidally disperse the two types of resins used, and otherwise be inert to each of them, and to the support or backing member selected to receive the coating, and evaporate at a suitably practical rate at the temperature employed. It could be entirely organic, and a single solvent for either of the two types of resins, and dispersing agent for the other, or a single solvent for both of them when a common solvent is available. It more readily can be a ketone, such as acetone, methyl ethyl ketone or methyl butyl ketone, as a common solvent; or a mixture of mutually soluble solvents.

The liquid organic suspending vehicle also can be a blend of several organic solvents. Such blend even may contain a minor portion of water when the blend includes at least one organic member that is mutually soluble with water. A minor portion of water also can be included when the organic suspending vehicle is a common solvent, e.g. acetone, for both the epoxy resin and the polyamide resin.

The liquid suspending vehicle also can comprise a major portion of water. In such case, it usually is advisable to include a wetting or dispersing agent to participate in emulsifying the resins and to assist in dispersing the polyvalent metal soap and any added pigment. A minor and small amount of an organic solvent can be included to enhance the emulsification of the resins.

Whether the liquid suspending vehicle is predominately organic or predominately aqueous, it has to be fluid enough to permit agitation of not only both of the resins that make up the dispersing-agent-binder but also the polyvalent metal soap, with or without added pigment, to give a homogeneous suspension of said soap and any pigment, and to enable the suspension to be spread over the surface to be coated by the composition to give a layer, when dry, of the order of one-quarter mil to one and one-half mils thick; and said suspending vehicle must be volatilizable at a temperature below the melting point of the polyvalent metal soap.

Accordingly, the applicable liquid suspending vehicle for the polyvalent metal soap and the resins that go into the dispersing-agent-binder may be broadly or generically referred to herein as a compatible liquid suspending vehicle that dissolves or colloidally disperses the different resins that provide the dispersing-agent-binder and is inert to it and also to both resins and the polyvalent metal soap, and any added pigment, and sufficiently fluid to allow applying the desired coating and to be volatilizable below the melting point of the soap. This definition includes any such vehicle composed predominately of water, as well as any composed essentially of an applicable organic solvent or mixture or blend of such solvents, and any aqueous solution embraced by the foregoing extended description and brief definition of the applicable liquid suspending vehicle.

Any such vehicle composed predominately of water or any such aqueous solution can be sub-generically referred to by the foregoing broad description in the first sentence of the just preceding paragraph, modified by prefixing the expression "liquid suspending vehicle" with the adjective "aqueous," and by omitting "dissolves or." Similarly, such applicable predominately organic vehicle can be referred to sub-generically by that same broad description modified instead only by prefixing "liquid suspending vehicle" with the adjective "organic."

From the foregoing extended description and brief definition of the applicable liquid suspending vehicle, a person of ordinary skill in the art involved readily can tell from the identity of an organic solvent and general information as to its properties whether it is suitable. In some cases a few simple check tests may be needed to note whether some particular solvent is compatible and can dissolve or colloidally disperse the required resins, and otherwise is inert to any other materials involved, and has the desired fluidity to enable applying the coating and volatility to permit drying it at a temperature below the melting point of the polyvalent metal soap. Such tests can be made readily by a person of such skill, and who would know how to make them, for only merely simple physical steps are involved. Their nature and conduct would be recognized easily from the type of information needed.

Thus, a person having ordinary skill in the art involved can select readily a suitable organic liquid suspending vehicle, whether it be a common solvent, a mixture of mutually soluble solvents, one which will colloidally disperse one or the other or both of the resins, or a blend of several compatible organic solvents, without or with a minor portion of water from the various examples and at least the following initial information about solvents for these respective resins.

For example, most of the polyamide resins dissolve in aliphatic solvents having oxygen in their constitution, such as an alkanol solvent as ethanol or a higher alkanol including other lower alkanols having, say, under seven carbon atoms, and which can be straight chain as propanol, butanol, or amyl alcohol, or branched chain as isopropanol or isobutanol; and as a lower alkanone such as acetone, methyl ethyl ketone, methyl butyl ketone, or a branched chain ketone as methyl isobutyl ketone; or an ester, e.g. a lower alkyl acetate as ethyl acetate.

Most polyamide resins also are soluble in mononuclear aromatic hydrocarbon solvents such as benzene, toluene, and xylene. These polyamides also are soluble to some extent in other aliphatic solvents, for example, a lower nitro-alkane as nitromethane.

Then, most of the applicable epoxy resins also dissolve in the abovementioned ketones, in the "Cellosolve" solvents, e.g. ethyleneglycol monoethyl ether, ethyleneglycol monomethyl ether, ethyleneglycol monobutyl ether, and ethyleneglycol monoethyl ether acetate, as well as in mixtures of such applicable solvents with any of the hereinmentioned aromatic hydocarbon solvents.

When water is the major part of the suspending vehicle, a wetting or dispersing agent usually should be included to enable more satisfactorily dispersing both types of resins, the polyvalent metal soap, and any inert pigment present. Such agent generally should be compatible with the other constituents for the coating composition. Beneficially it may be a nonionic wetting agent, such as a compatible "Triton" (made by Rohm & Haas Company) as "Triton X–100," i.e. $(C_8H_{17} \cdot C_6H_4O \cdot)(C_2H_4O)_xH$ and $(C_9H_{19} \cdot C_6H_4O \cdot)(C_2H_4O)_xH$, wherein $x$ is from eight to twelve; or an anionic, or cationic wetting agent such as "Triton K–60," i.e. a 25% aqueous solution of cetyl dimethyl benzyl ammonium chloride.

Finished coatings containing a polyvalent metal soap heretofore have been referred to as opaque. Since they actually do transmit some light, i.e. highly diffused light, before being subjected to impact or thermo change, it appears that the designation "non-transparent" may be a closer description of the nature of the coating.

While the polyvalent metal soap always is included to give the dry coating its non-transparency and whiteness, its effect may be fortified by including an inert pigment to increase its covering power, enhance its whiteness or otherwise modify its color, or to alter the rheological properties of the coating.

Thus, inert pigment can be included up to a maximum of about three parts to one part of the polyvalent metal soap. Examples of such inert pigements are calcium carbonate, titanium dioxide, zince oxide, zinc sulfide, lithopone, paint clays, diatomaceous earths, talc, satin white, and the like, or a finely-divided metal, e.g. aluminum.

Likewise, the inherent white pigmenting property of the polyvalent metal soap can be varied by adding a satisfactory amount of a suitable one of the readily available compatible colored inert pigments or coloring dyes which are sufficiently soluble in the suspending vehicle.

The invention as to these coating compositions is illustrated by, but not restricted to, the following examples:

*Example 1.—("Versamid 125," Epoxide Plastic ERL 2774, Calcium Stearate)*

Two hundred grams each of "Versamid 125" (a polyamide resin with 290–320 amine value, produced by General Mills, Inc., Minneapolis, Minnesota), and of Epoxide Plastic 2774 (an epoxy resin produced by Bakelite Division of Union Carbide Chemicals Corp.), were dissolved, under rapid agitation, in fifty kilos of methyl ethyl ketone. While still rapidly stirring, ten kilos of powdered calcium stearate were added, and the agitation was continued to give a smooth dispersion, i.e. until all agglomerates of the soap were broken down and to give a homogeneous dispersion. The latter, after being filtered through a fine screen to remove any dirt and other foreign matter, was ready for coating.

Several methods of coating are suitable, e.g. by brush, coating rolls, wire wound doctor rod, air knife, and others. This filtered coating composition, applied to a dark coated paper (of 18 lbs. per 500 of 24" x 36" sheets), and then dried, provides satisfactorily useful coatings of from 0.15 to one ounce per square yard, depending on the coating device adjustment, after drying the coated paper at about 200° F. The dry coated paper was kept at room temperature for twenty-four hours for the resin binder to become fully cured and attain stable properties. It melted at 300° F.

*Example 2.—("Versamid 115," Epon 1007, Zinc Stearate)*

Three kilos each of "Versamid 115" (General Mills polyamide resin, amine value 210–230), and of "Epon 1007" (Shell Chemical Co. epoxy resin), were dissolved, under rapid agitation, in a solvent mixture of seventeen kilos each of nitromethane, of butyl alcohol, and of toluol, and two kilos of water. While still stirring, ten kilos of powdered zinc stearate were added, and the agitation continued and the resulting dispersion filtered as in Example 1. The filtered coating composition then was applied to the paper used, and dried, as in Example 1. The dried and cured coating melted at about 200° F.

*Example 3.—("Versamid 115," "Epotuf 6301," Calcium Stearate and Talc)*

Part A.—One kilo of "Triton X–100" was added to twenty-five kilos of water and their solution agitated during the addition of twelve kilos of calcium stearate, and five kilos of talc. This gave a dispersion of calcium stearate and talc, which remained stable.

Part B.—One-half kilo of "Triton K–60" was mixed with five kilos each of toluene and butyl alcohol. Then two kilos each of "Epotuf 6301" (epoxy resin of Reichhold Chemicals Inc.; Gardner-Holdt viscosity C–G range, epoxy equivalent 450–525), and of "Versamid 115" were added, and the mixture of solvents and resin was agitated while there was added twenty-five kilos of water containing one hundred grams of glacial acetic acid, to produce a readily fluid dispersion of both resins dissolved in the solvents and the resulting solution in turn dispersed in the water.

This latter dispersion then was added under agitation, to the part A calcium stearate dispersion. The resulting coating composition was filtered and coated on paper, and dried, as in Example 1, and thereafter allowed to complete its curing. Cured it melted about 300° F.

*Example 4.—("Versamid 125," "Epotuf 6301," Stearylamine, Zinc Sebacate and Clay)*

Two kilos each of "Versamid 125" and "Epotuf 6301" were dissolved, under rapid agitation, in a combined solvent consisting of seventeen kilos each of ethyl acetate, ethanol, and toluol. While still stirring, there was added one kilo of stearylamine (as a modifier), and then eight kilos of powdered zinc sebacate and five kilos of clay were added. The agitation was continued until all agglomerates of the soap and of the clay were broken down and to give a homogeneous dispersion.

The resulting coating composition, after filtering as in Example 1, then was applied to paper, and dried, as in Example 1, and thereafter allowed to complete its curing. The dried and cured coating melted at about 400° F.

The coating produced in the foregoing examples initially after drying has to be handled carefully. That is so because by the time the solvent has been evaporated off the reaction between the polyamide and epoxy resins has not progressed far enough for sufficient chain and cross-linked reaction product to have been formed to provide the available binding power. Such care has to be observed until the curing (i.e. the chain and cross-linkage developing reaction) is substantially complete. That ordinarily occurs in about twelve to about twenty-four hours.

In order to make it possible to handle a coated paper or film material more easily and without risk of scuffing or marring the coating immediately after the vehicle has evaporated and before the resin binder has fully cured, it is advantageous to include in the coating an additional resin that causes the dried coating to have enhanced firmness so that it possesses suitable resistance to handling until the epoxy resin has cured. Such a coating composition, method and resulting coating is shown by, but not confined to, the following example:

*Example 5.—("Versamid 100," "Epotuf 6301," "VAGH," Calcium Stearate, Titanium Dioxide)*

Three kilos of "Versamid 100" (General Mills Polyamide resin, amine value 88–93), two kilos of "Epotuf 6301," and one kilo of "VAGH" (a Bakelite Division polyvinyl chloride acetate co-polymer with some hydroxyl groups present, 91% vinyl chloride, 3% vinyl acetate; molecular weight approximately 15,000), are dissolved in a mixed solvent suspending vehicle composed of twenty-five kilos each of methyl ethyl ketone and of toluene. To that solution and with rapid agitation there was added nine kilos of calcium stearate and three kilos of titanium dioxide. The agitation was continued until the dispersion was uniform. The resulting dispersion then was filtered as in Example 1. The filtered coating was applied to paper used, and dried, as in Example 1. The dried coated paper was easily handled after the drying was finished. It melted at 300° F.

In place of the "VAGH" resin for that advantage, other similarly effective resins can be used. For example, with some suitable, readily made modification in the composition of the suspending vehicle, a similarly effective amount of "Hypalon 20" (chloro-sulfonated polyethylene made by E. I. du Pont de Nemours & Co.) or of a polyvinyl acetate or acrylate resin can be used.

It is also possible to use the "VAGH" resin or other similarly effective resin in water dispersion type of coating composition for the same effect, as illustrated in, but not restricted by the following example:

*Example 6.—("Versamid 100," Epoxide Plastic "ERL 2774," "VAGH," Magnesium Stearate, Satin White)*

Part A.—One kilo of "Triton X–100" was dissolved in thirty liters of water, and their solution agitated during the addition of two kilos of "Versamid 100" and ten kilos of magnesium stearate and four and one-half kilos of satin white. This gave an aqueous dispersion of the "Versamid 100," the magnesium stearate, and the satin white, which remained stable.

Part B.—One-half kilo of "Triton K–60" was mixed with four kilos each of methyl ethyl ketone and toluene. Then two kilos of Epoxide Plastic ERL 2774 and one-half kilo of "VAGH" copolymer were added, and the mixture of solvents and resins was agitated while there was added twenty liters of water. There was produced a readily fluid dispersion of both of these resins dissolved in the mixed solvents and their solution in turn emulsified in the water.

These part A and part B dispersions were kept separated until coating was to be done with the coating composition. Then one part of part A was added to and admixed in one part of part B. The resulting coating composition was filtered and coated on paper and dried, as in Example 1; and the coating thereafter was allowed to complete its curing. The dried and cured coating melted at about 275° F.

While liquid "Versamid" resins were used in the foregoing examples, solid "Versamid" resins also can be used similarly and give correspondingly similar coating compositions, non-transparent coatings, and resulting recording blanks.

The epoxy resin of each of the examples is a condensation product of an organic dihydric compound with an epoxide, and more specifically of bisphenol A and epichlorphydrin. Bakelite's Epoxide Plastic ERL 2774 is a liquid with viscosity of about 10,500–19,500 centipoises at 75° F. by Brookfield; its epoxide equivalent is somewhere about 185–200. Shell's Epon 1007 has a Gardner-Holdt viscosity of $Y-Z_1$ range and epoxide equivalent of 1550–2000.

The various coating compositions of these examples and the invention can be applied to various types of supports or backing members, such as metallic foil, paper, plastic film, fabric, cardboard, etc. to give a recording blank or medium for stylus or impact, or even thermo, recording. For example, the dried and cured coated paper of each of the foregoing examples is a recording blank of this invention, and can be used either as a pressure sensitive, or heat sensitive recording paper.

Thus, the method of coating the paper with the respective coating compositions of the various foregoing examples and the respectively resulting coated papers illustrate the method of making recording blanks, as well as the resulting recording blanks of this invention. Other examples of the method of making the blanks and those recording blanks themselves are obtained by changes in chemical starting materials or their proportions.

Thus, the specific polyamide of any of the examples can be replaced in part or whole by any other applicable polyamide disclosed or referred to herein. Likewise, the specific epoxy resin of any of these examples can be replaced in part or whole by any other suitable epoxy resin herein disclosed or referred to. The ratio of polyamide to epoxy resin in any such example can be changed within the herein indicated operable range. Similarly, the particular polyvalent soap of any of the examples can be replaced in part or as whole by any other suitable polyvalent metal soap disclosed or referred to herein, or the weight proportion of soap to the sum of the two different resin constituents can be changed so long as the soap exceeds the total resin content.

Then also, there can be certain types of modifications in the recording blanks from the physical aspect, to fit various types of contemplated uses. For example, a recording blank is made by applying to a light-transparent or translucent backing member such as a translucent colorless or colored plastic, or a transparent plastic or a transparent plastic with a translucent coating on one surface of it, a layer of a coating composition of this invention and evaporating the suspending vehicle and thus drying that layer to a substantially opaque masking. The dry coating then is cured.

This combination provides a novel form of recording blank which can have either printed matter and/or designs formed in the polyvalent metal soap content of the coating in response to any well known method of recording, for example, the pressure of a stylus or impact of a printing type bar, or the like.

As a result, the transparent or translucent backing is exposed at those particular areas where the opaque (i.e. by the soap or pigmented soap) coating was removed or rendered transparent by the pressure or impact, thus enabling the blank to be used in light-projecting systems to project the recorded subject matter on a suitable screen, or for making copies as by the photographic or diazo or other methods.

A backing member of translucent material, such as amber colored glassine paper, or a clear film printed or coated to have a grainy black surface, bearing a dried coating of the coating composition of this invention, provides a good recording contrast that enables producing a good, sharp projected image.

Another effective type of recording medium is one made from a flexible backing member of paper, cardboard, and the like, with an applied and dried and cured coating of the coating composition of the invention. Such backing member, before application of the coating composition of this invention, can be of any color or merely be dark in appearance or can bear a colored or dark coating on either or both of its surfaces. Then the application on one of its surfaces of a coating of a white or light colored coating composition of this invention, followed by drying and curing, provides a recording blank having a white or light colored pressure- or thermo-sensitive coating of the dried and cured polyvalent metal soap dispersion on the dark colored backing member.

Such a recording blank can be subjected to any suitable typing or printing pressure or other impact to remove from, or compress and thereby make transparent the polyvalent metal soap in, any desired area of the coating of the invention. As a result, the contrast between the thus exposed dark colored backing member areas and the untouched areas of the coating makes the thus recorded subject matter easily readable.

Several recording blanks including certain of the types more fully described closely hereinabove are schematically illustrated with exaggerated thicknesses in the accompanying drawings, wherein:

FIG. 1 shows a recording blank with a pressure- and thermo-sensitive coating 10 of a dispersion of a polyvalent metal soap (with or without added pigment) held distributed through the dried and cured dispersing-agent-binder (i.e. chain and cross-linked reaction product of the polyamide and epoxy resins), which coating is fixed on the upper surface of a light-transparent backing member 11;

FIG. 2 shows a recording blank such as in FIG. 1, but with a translucent coating 12 on the underside of the backing member;

FIG. 3 shows a recording blank as in FIG. 1, but with the clear film 11 having a grainy black upper surface to which the coating 10 is bound;

FIG. 4 represents a recording blank having its pressure-sensitive coating 10 carried on the upper surface of a colored or dark backing member 14;

FIG. 5 illustrates a recording blank as in FIG. 1, but having a colored coating 15 on the underside of the transparent backing member 11; and FIG. 6 shows a recording blank as seen in FIG. 5, but having also on the upper surface of the backing member 11 a colored coating 15, to which the coating 10 is affixed. The lower coating 15 may be omitted.

While the individual aspects of the invention have been explained by giving fuller descriptive details of certain specific embodiments of it, it is understood that various modifications and substitutions may be made in its several different elements and parts. For example, while use of heat is not mentioned for the preparation of the solutions or colloidal dispersions or emulsions with the different resins, ordinarily ambient temperatures are wholly suitable. However, that does not preclude using heat, such as to assist in dissolving some of the solid resins in the selected solvents or when using water as the supending medium with no or only a small amount of some solvent for the resins. Other such agents than those named can be used. Thus, many changes and substitutions that occur to the persons of ordinary skill in the various arts here involved can be made without limiting the invention other than by the scope of the appended claims which are intended also to include equivalents of the various disclosed details of the disclosed embodiments.

What is claimed is:

1. A coating composition for application as a substantially continuous non-transparent coating on a surface, which composition comprises pigmenting material selected from the class consisting of (a) non-transparent discrete particles of a polyvalent metal soap of a fatty acid having a minimum of six carbon atoms and which soap is solid at the ambient temperature of preparation of the coating composition and use of the coating resulting from, and (b) said polyvalent metal soap (a) together with an inert pigment in an amount up to about three times the weight of said soap; said pigmenting material being dispersed throughout a volatilizable liquid suspending vehicle which is inert thereto and which comprises in from suspension to solution therein (i) at least one polyamide resin having an amine number of from about eighty-eight to about three hundred and fifty, and (ii) at least one epoxy resin; which resins react together, and are in a ratio to one another, to form a reaction product thereof, and which serve as a dispersing-agent-binder for said pigmenting material in said vehicle; said vehicle being otherwise inert to said resins and the surface on which the composition is to be applied and being volatilizable from the composition at a temperature below that at which change in physical character of said coating begins; said suspension containing said pigmenting material in an amount exceeding that of its total resin content which latter is at least two percent of the total weight of the pigmenting material and resins; the ingredients being so proportioned to one another for the mixture to be spreadable over the surface over which it is to be coated and for the dispersion of the pigmenting material in binder to remain fixed as a non-transparent coating on the surface after evaporation of the suspending vehicle; the non-transparency of this coating being from partially to practically completely reduced wherever the coating is placed under impact pressure such as by application of a writing stylus or typewriter key, whereby such thus applied impression easily is legible.

2. A coating composition as claimed in claim 1, wherein the soap has from six to about twenty-four carbon atoms.

3. A coating composition as claimed in claim 1, wherein the pigmenting material is from about two to about twenty-five times by weight the total amount of the resins.

4. A coating composition as claimed in claim 1, wherein the epoxy resin is a condensation product of bisphenol A and epichlorhydrin.

5. A coating composition as claimed in claim 4, wherein the polyamide resin has an amine number from about two hundred to about three hundred and twenty.

6. A coating composition as claimed in claim 1, wherein there are by weight from about ten to about eighty-five parts of epoxy resin to from about ninety to about fifteen parts of polyamide resin.

7. A coating composition as claimed in claim 1, wherein the suspending vehicle is a compatible organic solvent liquid suspending vehicle and the resins are in from suspension to solution therein, and the pigmenting material also is dispersed therein.

8. A coating composition as claimed in claim 1, wherein the suspending vehicle is predominately aqueous, and the resins and the pigmenting material are in suspension in the aqueous vehicle.

9. A coating composition as claimed in claim 8, wherein a compatable wetting agent is dissolved in the water in a quantity sufficient to enable the suspension of the resins and the pigmenting material therein.

10. The method of preparing a coating mixture for application as a substantially continuous non-transparent pressure- and thermo-sensitive coating on a surface, which method comprises adding to a liquid suspending vehicle at least one polyamide resin having an amine number of from about eighty-eight to about three hundred and fifty, and at least one epoxy resin, and in a ratio to one another to react together to form a chain and cross-linked reaction product thereof; dispersing in said vehicle while liquid a pigmenting material selected from the class consisting of (a) non-transparent discrete particles of a polyvalent metal soap of a fatty acid which has a minimum of six carbon atoms and is solid at the ambient temperature of preparation of the coating composition and use of the coating prepared therefrom, and (b) said polyvalent metal soap (a) together with an inert pigment in an amount up to about three-quarters of the total pigmenting material weight; said resins serving as a dispersing-agent-binder for said pigmenting material in said vehicle; said vehicle being otherwise inert to said resins and the surface on which the composition is to be applied and being volatilizable from the composition at a temperature below that at which change in physical character of said coating begins; said suspension containing said pigmenting material in an amount exceeding that of its total resin content which latter is a minimum of two percent by weight of the total of the pigmenting material and the resins; the ingredients being so proportioned to one another for the mixture to be spreadable over the surface over which it is to be coated and for the dispersion of the pigmenting material in binder to remain fixed as a non-transparent coating on the surface after evaporation of the suspending vehicle.

11. A recording blank comprising a backing member and on a surface of it a non-transparent coating in the form of a dry dispersion of pigmenting material selected from the class consisting of (a) non-transparent discrete particles of a polyvalent metal soap of a fatty acid which has a minimum of six carbon atoms and is solid at the ambient temperature, and (b) said pigmenting material (a) together with an inert pigment in an amount up to about three-quarters of the total weight of pigmenting material, in a synthetic resin binder chain and cross-linked reaction product of the condensation of an epoxy resin and a polyamide resin having an amine number from about eighty-eight to about three hundred and fifty; which pigmenting material is solid and non-transparent at the ambient temperature of use of said recording blank; said binder being a minimum of two percent by weight of the total of pigmenting material and binder, and the amount of pigmenting material exveeds that of the binder; the non-transparency of this coating being from partially to practically completely reduced wherever the coating is placed under impact pressure such as by application of a writing stylus or typewriter key, or is heated to a temperature that increases the light-transmissivity of the coating, whereby any such thus applied impression easily is legible.

12. A recording blank as claimed in claim 11, wherein the backing member is transparent.

13. A recording blank as claimed in claim 11, wherein the backing member has a color which is discernible in contrast with that of the unchanged non-transparent coating.

14. A recording blank as claimed in claim 11, wherein at least the surface of the backing member, to which the pressure-sensitive coating is affixed has a color which is discernible in contrast with that of the unchanged non-transparent coating on that surface.

15. A recording blank as claimed in claim 11, wherein the backing member is translucent.

References Cited in the file of this patent

UNITED STATES PATENTS

| | | |
|---|---|---|
| 1,783,442 | Mayer et al. | Dec. 2, 1930 |
| 2,313,808 | Dalton | Mar. 16, 1943 |
| 2,589,245 | Greenlee | Mar. 18, 1952 |
| 2,710,263 | Clark et al. | July 7, 1955 |

OTHER REFERENCES

Renfrew: Ind. and Eng. Chem., October 1954, pages 2226–2232, vol. 46, No. 10.